Jan. 29, 1952     F. W. KAZDIN     2,583,853
DIATHERMY ELECTRODE
Filed Aug. 8, 1950
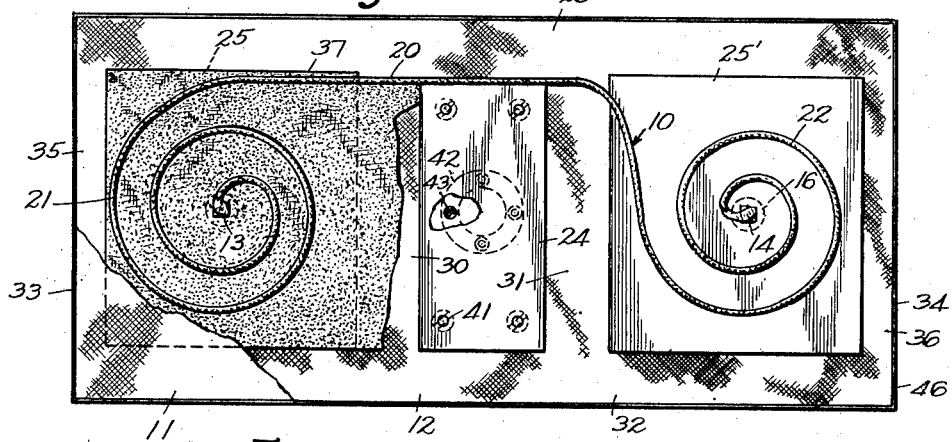
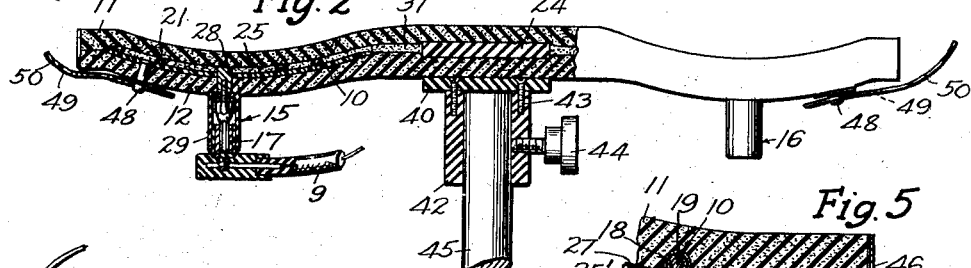
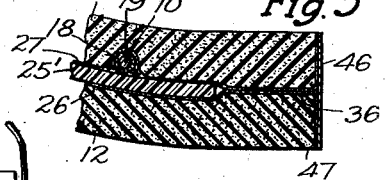
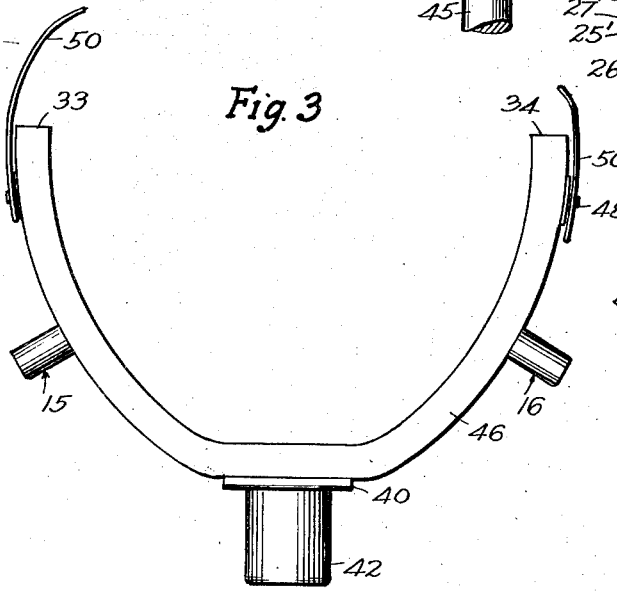
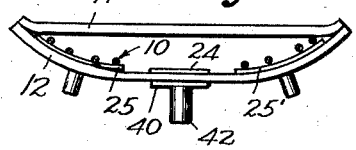
Inventor
Frank W. Kazdin
BY
Harry Jacobson
Attorney Patented Jan. 29, 1952

2,583,853

UNITED STATES PATENT OFFICE 2,583,853

DIATHERMY ELECTRODE

Frank W. Kazdin, Laurelton, N. Y.

Application August 8, 1950, Serial No. 178,219

11 Claims. (Cl. 128—411)

This invention relates to diathermy electrodes and particularly to the inductive type capable of being changed in shape to fit various parts of a patient's body.

Previously known electrodes of the inductive type have been made either in the form of heavily insulated flexible cables or cables or conductors set in rigidly held coils within rigid hollow housings. The housings have been hinged together like hinge leaves by relatively intricate and expensive hinge means, hinged electrical connections between the ends of the coils being also employed to permit the hinge leaves to be adjusted relatively to each other and thereby to shape the electrode to fit the contour of the body surface requiring treatment.

The present invention contemplates the provision of a simple but efficient and relatively inexpensive and safe flexible inductive electrode easily fitted to any part of the body and devoid of hinges and having as its only connections sturdy end connections and hence not likely to get out of order or to require repair or adjustment.

The invention further contemplates the provision of a single flexible conductor wound into substantially plane spiral coils of varying diameters and encased in a suitable flexible insulating casing having spaced stiffening and shaping members therein whereby the protective casing may readily be fitted to the body without danger of damage to the conductor or to the electrical connections thereto.

The invention further contemplates the provision of spaced apart coils bent from a single length of flexible expansible and contractible conducting material in the form of a helically wound tube of a plurality of sets of braided wire together with a sponge rubber casing stiffened at the coils, there to retain its shape and enclosing and protecting the tube, the marginal portions and additional intermediate portions of the casing being flexible for quick and easy adjustment in shape of the stiffened parts of the electrode relatively to each other.

The invention further contemplates the provision of a simple method of making a flexibly shaped and stiffened electrode for use in conductive diathermy treatment and particularly for encasing the conductor used in the electrode.

The various objects of the invention will be clear from the description which follows and from the drawing, in which Fig. 1 is an elevational view of the electrode as it appears when flattened out as much as possible, part of the inner encasing sheet and certain other parts being broken away to show the interior structure.

Fig. 2 is a longitudinal sectional view thereof partly in elevation and omitting the intermediate portion of the securing strap between the ends thereof.

Fig. 3 is an edge view of the electrode as it appears in its normal and substantially unstressed state.

Fig. 4 is a top plan view of the electrode parts as they appear after the parts have been assembled and before the inner casing sheet has been completely secured in place to the outer casing sheet.

Fig. 5 is a fragmentary enlarged sectional view similar to Fig. 2 of an end portion of the electrode but showing a modified form of the construction.

In the practical embodiment of the invention shown by way of example, the conductor 10 is preferably permanently encased within a pair of similar relatively thick sponge rubber sheets 11 and 12 and is secured at its respective ends 13 and 14 to suitable terminals as 15 and 16. Each terminal is preferably in the form of a spring post adapted to be electrically and physically engaged by a suitable socket as 17 at the end of an insulated cable 9 carrying current from a short wave diathermy machine or the like. While the conductor 10 is adequately protected and insulated, it is extremely flexible, being also expansible and contractible and may be bent back and forth indefinitely without appreciable effect thereon. Preferably the conductor is made of a plurality of sets of fine tinned copper wire interbraided and interwoven into the tubular form shown at 18, Fig. 5, being of uniform structure and shape throughout its length. Reinforcing the conductor is an interior flexible core 19 preferably of braided cord. It will be understood that by reason of the braiding thereof, the wire strands forming the conductor adjust themselves readily to bending stresses without permanent deformation or the accumulation of stresses beyond the elastic limit thereof and that the strands return to their initial shapes and positions when the stresses thereon are removed. Consequently, the conductor 10 is made of a single length of such braided tubular wire without the necessity for any intermediate connections, joints or hinges of any kind between the ends thereof, regardless of how much or how many times the electrode is bent to shape it in fitting the body.

However, only the relatively straight intermediate or non-coiled intermediate portion 20 of the conductor is subjected to bending, the remainder being suitably held in the form of spaced apart pancake coils 21 and 22 slightly concave inwardly and bent to make about two turns at each end of the conductor. The intermediate portion 20 is sandwiched between and adhesively secured to the sheets 11 and 12, each of a single unmutilated piece of sponge rubber or the like. To aid in holding said portion in place, it is arranged at an end edge of the rigid insulating plate 24 of suitable material such as Bakelite or hard rubber (Fig. 1), said portion 20 being preferably positioned longitudinally in the marginal portion 23 along the side edges of the sheets 11 and 12. As shown in Fig. 2, the plate 24 is also sandwiched between the sheets 11 and 12.

To hold the turns of the coils 21 and 22 against shifting materially and at the same time to impart an inwardly concave shape to the coils and to those adjacent parts of the electrode on opposite sides of the plate 24, a pair of suitable concave stiffening sheets as 25 and 25' are employed, said sheets being made of suitable synthetic resin such as "Lucite" or "Plexiglas" or the like of a uniform thickness somewhat less than that of the plate 24. One sheet 25 is arranged between the coil 21 and the inner surface of the outer sheet 12 while the other sheet 25' is arranged between the coil 22 and said inner surface. The sheets are preferably adhesively secured to said surface by a layer of suitable adhesive as 26 (Fig. 5) preferably though not necessarily of the rubber cement type. The turns of the coils 21 and 22 are similarly adhesively secured to the respective inner faces of the sheets 25 and 25' by the layer 27 of adhesive and in suitable spaced relation.

The coils are so wound that current flows therethrough in opposite directions running clockwise through one coil and counterclockwise through the other. The innermost flattened end of each coil is secured to the exposed end of a terminal member 28 as by soldering, said member being preferably square in cross section and passing through a corresponding square hole in the sheet 25 or 25' and through the sponge rubber sheet 12 to prevent turning of the terminal member when the parts are screwed together. Entering the internally threaded hole in the member 28 is the externally threaded part of the spring terminal 17, which is provided with a shoulder engaging the top of the insulating tube 29 which surrounds and protects the terminal, said shoulder securing the tube to the sheet 12. The plastic sheets 25 and 25' are spaced longitudinally from and on opposite sides of the plate 24 to provide the unstiffened and relatively free flexible portions 30 and 31 of the electrode extending completely thereacross from one side edge to the other and constituting the bending areas across which the electrode is bent as it is adjusted to the shape of the body of the patient.

Similarly, the sheets 25 and 25' are narrower than the sheets 11 and 12 to leave the free flexible marginal portion 23 and 32 on the electrode. Said sheets 25 and 25' are also spaced longitudinally away from the respective end edges 33 and 34 of the electrode to leave unstiffened end marginal portions 35 and 36. In the form of the invention shown in Figs. 1 and 2, the areas 30 and 31 as well as those parts of the sheets 25 and 25' between the turns of the coils are covered with a layer 37 of padding or filling material such as felt or the like to provide a cementing surface flush with the inner surface of the plate 24. The padding 37 is cemented to the sheets 25, 25' and 12, and the inner sheet 11 is then cemented to the padding and to the free marginal areas of the sheet 11 as well as to the central plate 24 in the manner to be later explained thereby sandwiching the coils and said plate between the sponge rubber sheets. The plate 24 serves as a support, being aligned with and secured to the similar plate 40 on the outside of the rubber sheet 12 as by means of the screws 41 passing through the plates and the sheet 12. The plate 40 in turn carries the sleeve 42, being screwed thereto by the screws 43. Adapted to enter the sleeve and to be removably secured thereto as by the set screw 44 is the bar 45 which is part of a suitable bracket, not shown, for holding the electrode in any desired position in a well known manner. After the sheets 11 and 12 have been assembled with the coils and the plate 24 therebetween, the side and end edges of said sheets are covered with a peripheral binding strip 46 of rubber preferably vulcanized thereto and securely holding said edges together and concealing the joint therebetween.

In the form of the electrode shown in Fig. 5, the padding layer 37 is omitted and the inner surface of the sheet 11 is adhesively secured directly to the conductor coils 21 and 22, to the adjacent exposed parts of the inner surfaces of the sheets 25 and 25', to the plate 24 and to the otherwise uncovered or free portions of the sheet 12 at the intermediate areas 30, 31 and the marginal areas 23, 32, 35 and 36, the edge binding 46 being also shown adhesively secured in place as by the layer 47 of adhesive.

When completed, the electrodes assumes the generally U-shaped form shown in Fig. 3, the plate 24 tending to maintain the middle part of the electrode substantially flat and the curved relatively stiff sheets 25 and 25' maintaining the side portions of the electrode slightly concave inwardly, said side portions tending to close upon each other when the end edges 33 and 34 thereof are moved apart more than a predetermined amount and then released. To effect this result, the inner sheet 11 is made shorter than the sheet 12 by the amount necessary to give the desired general curvature to the electrode. As shown in Fig. 4, the sheets 25 and 25', the conductor 10 and its connections, the plate 24 as well as the plate 40 and the parts secured thereto are first assembled to the faces of the outer sheet 12. One end portion of said sheet 12 is then cemented in face to face relation to the corresponding end portion of the inner sheet 11. The outer sheet 12 is then curved enough to permit the other end portion of said outer sheet to be secured to the adjacent end of the inner sheet with the ends in substantial registration with each other. Since the inner sheet is made shorter than the outer sheet, said outer sheet becomes curved between the cemented ends thereof while the inner sheet is tensioned and is substantially straight, there being consequently a considerable space between the sheets permitting access to the exposed sheet surfaces and parts thereon for the application of adhesive. Adhesive having been applied to said surfaces and parts such as the padding, if any, the coils, plate and the like, the outer sheet 12 is then curved concavely inwardly to a still greater extent, that is, to a shorter radius merely by moving its end edges 33 and 34 toward each other. Such movement also bends the inner sheet 11 concavely inwardly and if continued to a sufficient extent, finally forces the shorter sheet 11 with considerable pressure against the longer sheet 12 and against the parts assembled thereon. After the adhesive is set, the parts are self-maintained in the curved position thereof as shown in Fig. 3 and while to some extent resisting movement therefrom, may nevertheless readily be moved out of said position toward and from each other to curve the electrode more or less by manipulating the side portions of the electrode accordingly, as shown for example in Fig. 2, wherein the electrode is flattened out to the maximum extent.

A strap-holding pin as 48 is secured to each of the plates 25 and 25' and projects beyond the outer face of the sheet 12, said pin being forced through a selected hole as 49 in the end part of a suitable strap as 50 (Figs. 2 and 3) extending between the pins whereby the electrode may be held in position and in its more or less curved or flattened shape on the body. The side portions of the electrode may be adjusted readily throughout a wide range and even doubled on each other inwardly or outwardly because of the flexibility of the unstiffened areas 30 and 31 especially along transverse lines thereof, while the stiffening sheets 25 and 25' permit the electrode to be self-sustaining and to stand on edge if desired and give the side portions an initial concavity and preventing collapse of the electrode or undesired limpness therein.

When spread out, the electrode tends to come back to the position of Fig. 3 and hence may be clamped about the body in some cases without the aid of the strap 50 or the bar 45. No springs, hinges or intermediate connections of any kind being here involved and the parts being adjustable by reason of the flexibility thereof, it will be seen that the electrode is inexpensive to manufacture and to maintain and is extremely durable as well as efficient, needing no lubrication nor any other attention, all of the important parts being fully encased and protected in yieldable flexible resilient and insulating cushioning material. It will consequently be seen that the invention is well designed to perform its intended functions efficiently and in a commerically practical manner.

I claim:

1. In an electrode of the character described, a flexible expansible and contractible metallic member coiled into a pancake coil at each end thereof and having an intermediate portion extending directly between the coils, a central plate of non-conducting material between the coils and adjacent part of the intermediate portion of the member, a relatively rigid coil-supporting sheet of non-conducting material in face to face relation with one coil and arranged on one side of and in longitudinal spaced relation to the central plate, a similar coil-supporting sheet for the other coil arranged on the other side of and in longitudinal spaced relation to the central plate and a pair of rubber sheets, the inner of said sheets being arranged on the coils and on one face of the plate and the outer rubber sheet being arranged on the outer faces of the plate and of the coil-supporting sheets, said rubber sheets being secured together and completely encasing the metallic member, the central plate and the coil-supporting sheets.

2. The electrode of claim 1 and a rubber binding strip secured to the end edges and to the side edges of the rubber sheets and sealing the joint therebetween.

3. The electrode of claim 1, those parts of the metallic member on each side of the central plate and in the intermediate portion of the member being free of the coil-supporting sheets and being freely flexible on the bending of the electrode at those areas thereof between the coil-supporting sheets and the central plate.

4. The electrode of claim 1, the metallic member being braided of a plurality of sets of helically wound relatively fine wire and being of uniform structure throughout the length thereof except at the extreme ends thereof, said ends being flattened.

5. The electrode of claim 1, and padding between the turns of each coil and between the coil-supporting sheets and the central plate, the inner rubber sheet being secured to one face of the padding.

6. The electrode of claim 1, the rubber sheets being of sponge rubber, the coil-supporting sheets being of lesser width than that of the rubber sheets and being spaced inwardly from the side and end edges of the rubber sheets to provide a marginal area around the periphery of each of the rubber sheets secured directly to the corresponding area of the other sheet.

7. The electrode of claim 6, the inner rubber sheet being shorter than the outer rubber sheet and secured thereto with the end edges of the rubber sheets in registration respectively whereby the electrode assumes an inwardly concave shape in its normal position.

8. The electrode of claim 1, each of the rubber sheets being of a single unmutilated piece of sponge rubber, the inner of the sponge rubber sheets being shorter than the outer of said sheets and being secured thereto with the respective end edges thereof in registration with the corresponding edges of the other sheet.

9. In an electrode of the character described, a pair of unmutilated sponge rubber sheets coextensive in width, one of said sheets being shorter than and secured to the other in face to face relation and with the respective end edges thereof in registration with the end edges of the other sheet, a flexible length of tubular braided wire adhesively secured between the sheets, each end portion of said wire being coiled, a relatively rigid stiffening sheet between each of the coiled portions of the wire and said other sheet and adhesively secured thereto, and a terminal for each coiled portion passing through said other sheet and through each stiffening sheet into electrical contact with the coiled portion.

10. The electrode of claim 9, the terminal being square in cross section and entering a correspondingly shaped hole in the stiffening sheet, a relatively rigid central plate between and in longitudinal spaced relation to the stiffening sheets and secured to the sponge rubber sheets, and a supporting sleeve secured to said plate and arranged outwardly of the rubber sheets.

11. The electrode of claim 9, and a binding strip secured to the end and side edges of the rubber sheets and concealing the joint therebetween.

FRANK W. KAZDIN.

REFERENCES CITED

The following references are of record in the file of this patent:

UNITED STATES PATENTS

| Number | Name | Date |
|---|---|---|
| 2,110,392 | Dorr | Mar. 8, 1938 |
| 2,130,756 | Rose | Sept. 28, 1938 |
| 2,404,283 | Gieringer | July 16, 1946 |